July 11, 1939.   H. B. DUANE ET AL   2,165,354
COMBINED CYLINDER FORMING AND FILLING MACHINE
Filed Oct. 3, 1936   5 Sheets-Sheet 1
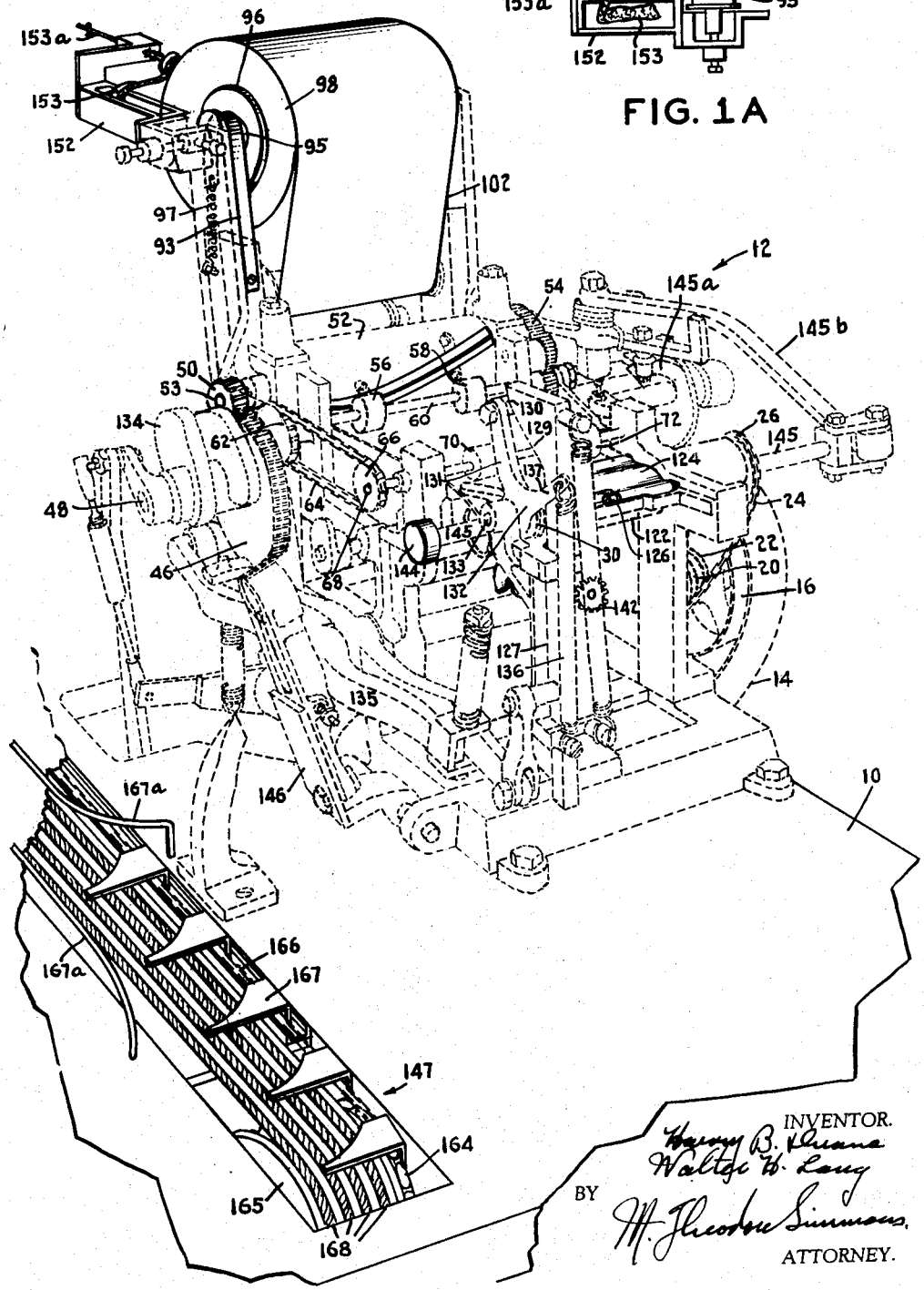
INVENTOR.
Harry B. Duane
Walter W. Lang
BY
H. Theodore Simmons
ATTORNEY.

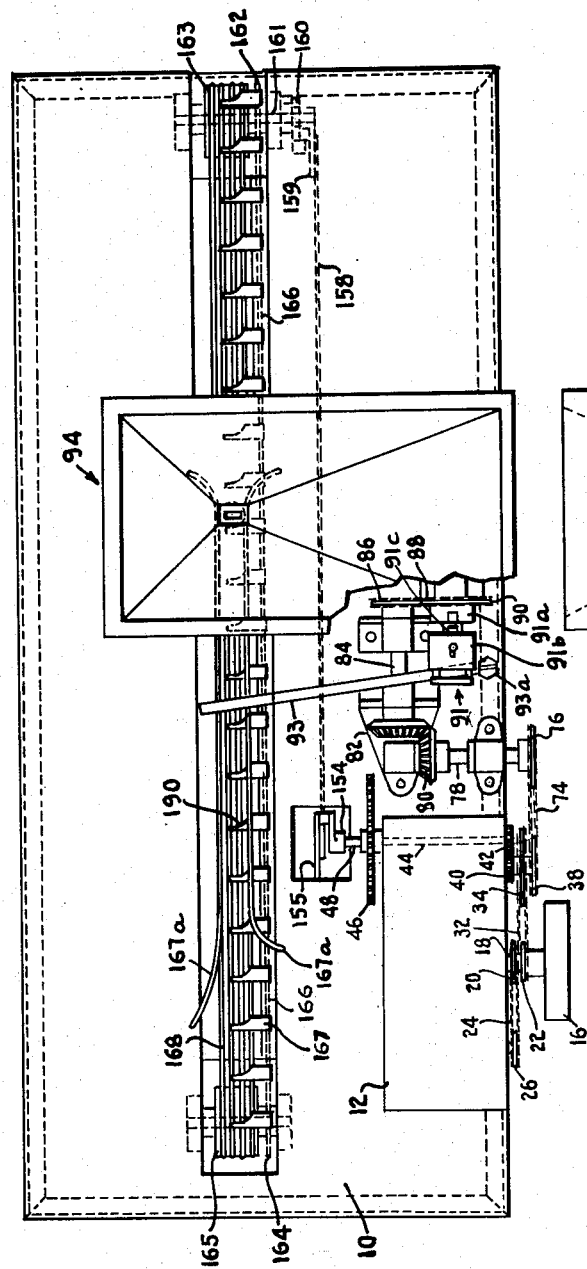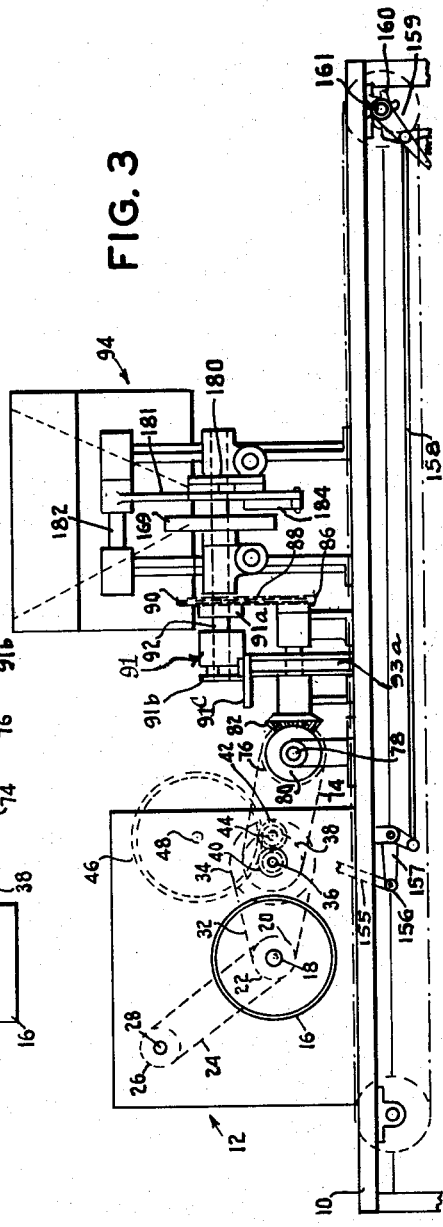

July 11, 1939.  H. B. DUANE ET AL  2,165,354
COMBINED CYLINDER FORMING AND FILLING MACHINE
Filed Oct. 3, 1936  5 Sheets-Sheet 3

INVENTOR.
Harry B. Duane
BY Walter H. Lang
M. Theodore Simmons
ATTORNEY.

July 11, 1939.  H. B. DUANE ET AL  2,165,354
COMBINED CYLINDER FORMING AND FILLING MACHINE
Filed Oct. 3, 1936  5 Sheets-Sheet 5
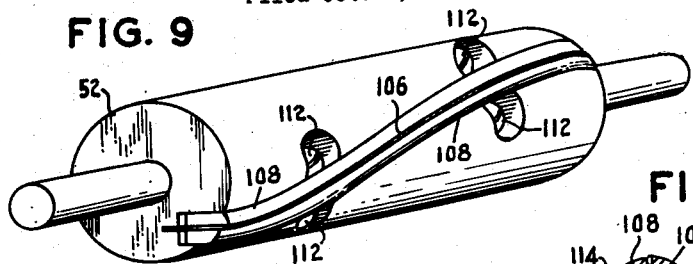
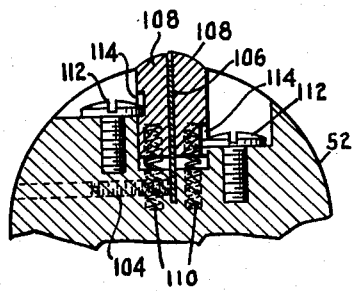
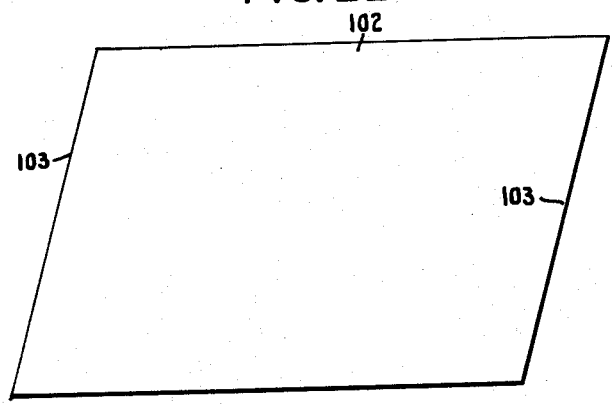
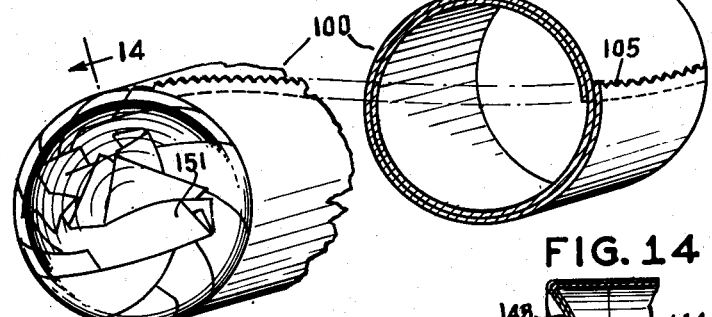
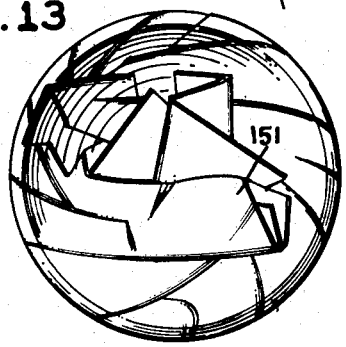
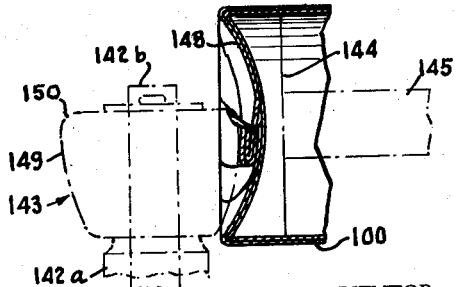
INVENTOR.
Harry B. Duane
Walter H. Lang
BY
M. Theodore Simmons
ATTORNEY.

Patented July 11, 1939

2,165,354

UNITED STATES PATENT OFFICE 2,165,354

COMBINED CYLINDER FORMING AND FILLING MACHINE

Harry B. Duane, Boston, and Walter H. Long, Malden, Mass., assignors to The Smack Corporation, New York, N. Y., a corporation of Delaware Application October 3, 1936, Serial No. 103,912

14 Claims. (Cl. 93—3)

This invention relates generally to the confectioner's art and more particularly to improvements in a special type of machine for forming cylindrical cups out of paper, foil, or other sheet material, in combination with an automatic measuring and filling machine. In the present embodiment the machine is used for producing paper packaged ice cream, but its usefulness with other substances will be readily comprehended. Also the component parts of the machine may be used separately.

Our invention has for an object to provide a container of more than one wrapping of material, wherein the outer end of the wrapper is caused to lay flat against the cylinder without glue or mechanical holding arrangements.

A further object of our invention is to provide a container with a reenforced closed bottom that nevertheless may be easily and readily opened so that the wrapper may be unwound from the product contained therein.

Further objects are to provide in a cylinder forming machine an improved knife to cut the paper or other material on the bias; an improved guard and guide for the cylinder forming mandrel, which will allow ready access to the mandrel and material formed thereon in case of emergency; and an improved forming head for forming the bottom of the container.

Still other objects are to provide an automatic tensioning brake for the roll of paper or other material to prevent irregular feeding of same, and moistening means to prevent brittleness and tearing of the paper or other material while crimping the bottom. Still another object is to provide driving and clutch control means of simple and fool-proof construction.

A still further object is to provide a self-adjusting conveyor of simple construction, readily cleanable and not affected by atmospheric conditions, such as found in an ice cream plant, for example.

An even further object of our invention is to provide a machine unit wherein paper or other material is fed into a machine, a self-supporting cylinder is formed therefrom, the cylinder passes to a filling station where it is automatically filled with a measured quantity of material, and is automatically delivered from the machine.

Other objects of our invention will be apparent from the following description and the accompanying drawings in which are illustrated elements considered pertinent for the demonstration of the invention. In the drawings—

Figure 1 is a perspective view showing in dotted lines a cylinder forming machine, the specific improvements being shown in full lines, a partial view of the table and a conveyor means:

Fig. 1A is a detail in plan view of a portion of the paper roll showing means for moistening the edge of same:

Fig. 2 is a plan view of the machine, indicating the cylinder forming portion diagrammatically, and showing the automatic measuring and filling portion with the intercommunicating driving and belt conveying mechanism therefor, parts being broken away to facilitate illustration:

Fig. 3 is a side elevation of the parts shown in Fig. 2, looking at the rear of the complete machine:

Fig. 9 is a perspective view of the knife roller with the knife mounted therein:

Fig. 10 is an enlarged fragmentary sectional detail showing the mounting of the knife:

Fig. 11 is a detailed diagrammatic plan view showing the shape the paper is cut to before the cylindrical container is made:

Fig. 12 is a perspective view of a container showing the crimped bottom and with parts broken away and sectioned to show the wrapping forming the container and the overlap of the sides:

Fig. 13 is an enlarged view of the bottom of the container showing the new crimping:

Fig. 14 is a partial cross sectional view taken on line 14—14 of Fig. 12 and showing in dot and dash lines the relative position of the bottom forming head and the plunger.

Figure 4:
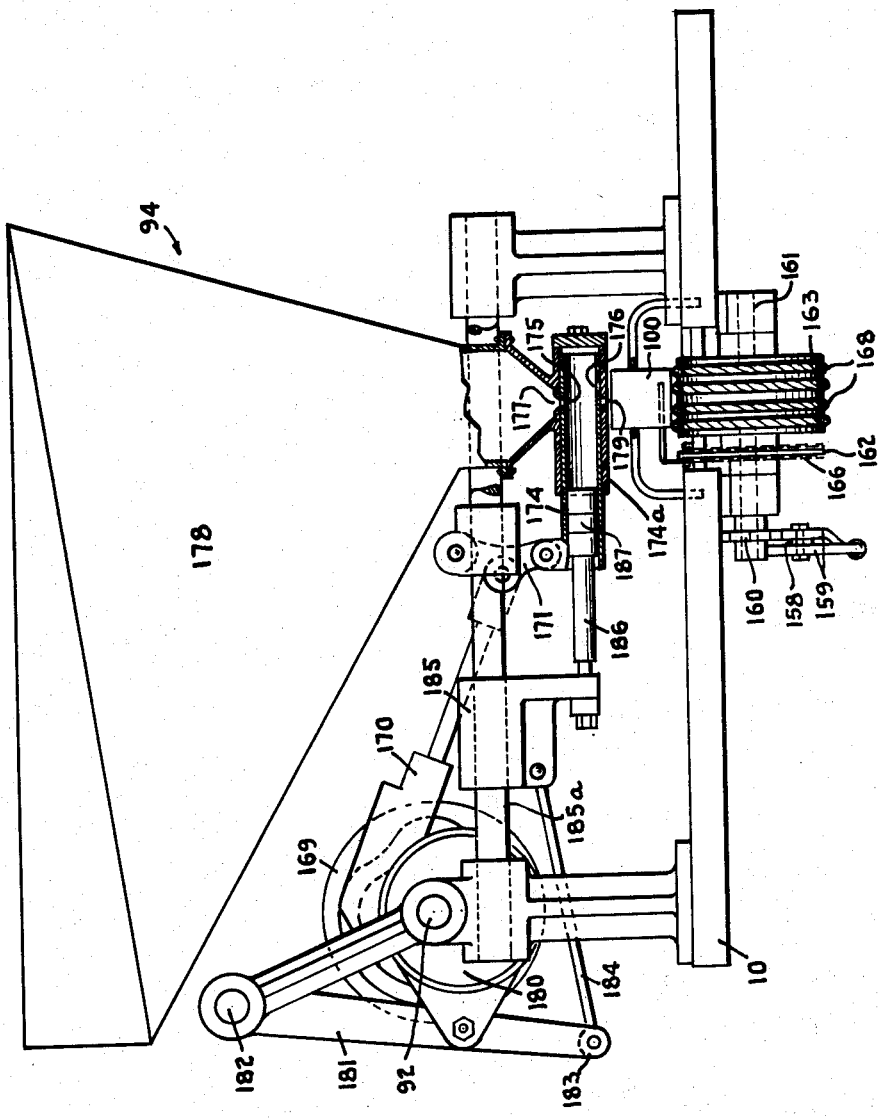
Fig. 4 is a side elevation view of the automatic measuring and filling station of the machine with parts broken away and in section for clarity.

To meet the demands for a mobile, compact and complete unit for the packaging of ice cream and other products we have made certain improvements and modifications in similar but larger machines heretofore successfully used commercially.

As will be seen by reference to Figs. 1, 2 and 3, a table 10, the dimensions of which are approximately 70" long by 30" wide, having any suitable supporting framework and cross bracing with the legs of said frame mounted on rollers (not shown), has mounted thereon a cylinder forming mechanism 12 similar in its general character to that shown and described in United States Letters Patent No. 1,752,995, April 1, 1930.

Sufficient of the operation and mechanism of such machine will be described hereinafter.

Mounted between the supporting legs of the table is a motor (not shown) for furnishing power to drive the parts of the cylinder forming mechanism 12, the automatic measuring and filling mechanism, and the intercommunicating conveyor. Attached to the shaft of the motor is a pulley which drives belt 14 transmitting power from the motor to pulley 16 secured on shaft 18 of the cylinder forming mechanism or station. On shaft 18 is also secured sprockets 20 and 22, the sprocket 20 furnishing power through chain 24, for driving sprocket 26 secured to shaft 28 for turning the mandrel 30 upon which the paper cylinder is formed. The various shafts are suitably mounted for rotation and support in bearings on the frame of the machine. From sprocket 22 power is transmitted by chain 32 to sprocket 34 secured to shaft 36 which also has sprocket 38 and gear 40 secured thereon. Gear 40 transmits power to the opposite side of the machine by meshing with gear 42 secured to shaft 44, mounted in suitable bearings on the frame of the machine, the opposite end of which shaft has a gear (not shown) but similar to gear 42 and meshing with gear 46 secured to a shaft 48 which drives the bottom roller 51 over which the paper for the forming of the container is passed.

Also secured to shaft 48 is a crank arm for positively driving and keeping the conveyor mechanism in synchronism with the delivery and forming of the container on the cylinder forming station and the automatic measuring and filling station. Meshing with gear 46 is a pinion 50 for turning the shaft 53 in which the top or knife roller 52 is secured. At the opposite end of shaft 53 to which the gear 50 is secured is another gear 54 meshing with a train of gears for transmitting power to a pair of knurled rollers 56—58 on shaft 60, said knurled rollers feeding the paper for the forming of the container delivered from the cutting rollers 51—52. On the opposite end of shaft 60 to which its driving gear is secured, is fastened a sprocket 62 for driving chain 64 and sprocket 66, secured to shaft 68 having knurled rollers 70—72 secured thereon for feeding the paper from the feed rollers 56—58 to the cylinder forming mandrel 30.

The automatic measuring and filling mechanism 94 is operated in synchronism with the remainder of the apparatus, the driving power for same being taken from sprocket 38, secured to shaft 36 of the cylinder forming mechanism and transmitted by chain 74 to sprocket 76 secured to shaft 78 of the power drive for the automatic measuring and filling mechanism. Shaft 78 is mounted for rotation in suitable bearings and has at the opposite end from the sprocket 76, a bevel gear 80 meshing with bevel gear 82 for driving a suitably mounted shaft 84 at right angles to shaft 78. To the opposite end of shaft 84 is secured a sprocket 86 for driving a chain 88 and a sprocket 90 secured to shaft 92, said shaft 92 having associated with it mechanism for the control of the automatic measuring and filling of ice cream from the hopper 94.

As shown in Fig. 1, there is wound upon a spool 96 a roll of paper or other material 98 from which the containers 100 are to be made. A web of this paper is passed between the top and bottom rollers 52—51 and fed toward the cylinder forming mandrel 30.

A knife 106 with serrated edge for cutting the paper 98 is secured by set screws 104 in roller 52. As shown in Fig. 9, this knife 106 is mounted to follow the curve of the roller consistent with the lead angle desired for the biasing cut of the paper. On each side of the exposed portion of the knife 106 is placed a vertically slidable stripper bar 108 which is forced outwardly by springs 110 and is limited in its outward and inward movement by the heads of the screws 112 engaging in grooves 114 in the stripper bars.

Roller 51 has mounted in a groove 116 in any well-known manner a soft rubber strip 118 which allows the paper 102 to be cut without damaging the cutting edge of the knife 106. The groove 116 is of a shape to correspond with the knife 106.

The diameter of the rollers 52—51 are chosen to suit the amount of paper required for the finished container to be cut in one revolution of the rollers.

After one revolution of the rollers 52—51 the serrated but not severed paper is guided toward the cylinder forming mandrel 30 by the knurled rollers 56—58 and 70—72.

Mandrel 30 and its associated mechanism travels at a faster speed than the cutting rollers and the knurled rollers and as the paper is fed onto the mandrel 30, the faster speed of the mechanism exerts a pull on the paper 102 sufficient to tear it along the line of serrations made by the knife 106.

Figure 5:
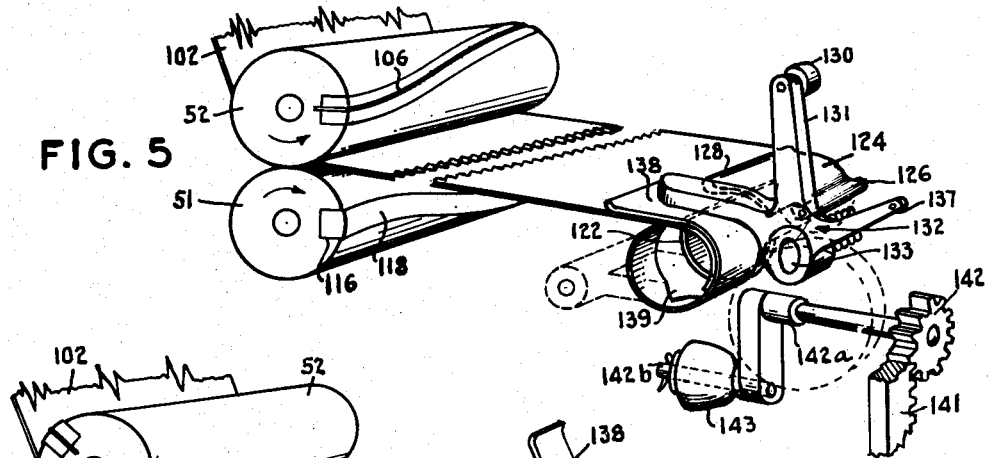
Figs. 5, 6, 7 and 8 are perspective views showing the various steps in the formation of the cylindrical container.
Figure 6:
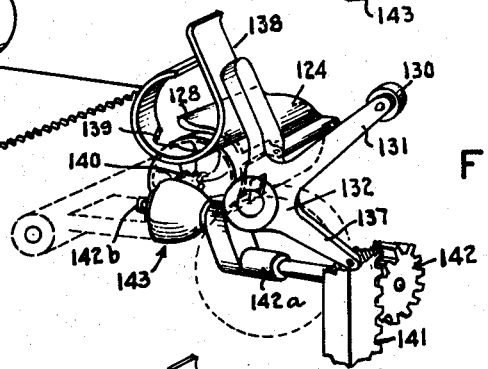

Referring to Figs. 5, 6, 7 and 8, as the detached paper is fed to the mandrel 30 a guide comprising a stationary lower part 122 and a movable, flapper-type, upper part 124 guides the paper around the mandrel. The flapper guard is loosely pivoted on a pin 126 mounted in the side frame of the machine (Fig. 1) and has its outer end 128 turned up so as to deflect the paper as it comes from the rollers 70—72 and guide it around the mandrel. This outer end 128 is also of heavier cross section than the rest of the guide so as to hold the same down in place by gravity. The guard can be raised readily about its pivot pin 126 for inspection of the container being formed on the mandrel 30 or to remove any torn or imperfect containers that may stick to same. As soon as the detached paper has been wound around mandrel 30 a bar 127 (Fig. 1) begins to rise under the action of cam 134, on shaft 48, operating pivoted lever 135. The bar 127 has at its upper end a holding cam 129 (Fig. 1 shows the cam at the lower end of its stroke) that is adapted to engage a roller 130 on arm 131 of the twister mechanism 132, which is pivoted at 133 to a suitable support. As the twister 132 is moved from its lowermost position it is turned about its pivot point 133 by spring 136 fastened to an extension arm 137 on twister 132. This movement raises the curved finger 138 which is adapted, on its upward movement, to engage the paper cylinder near its outer edge and causes the same to twist about the end of the mandrel, which continues to rotate, to start the bottom-forming operation. V-shaped slot 139 in the twisting finger 138 permits free passage of the partially twisted end 140 of the paper cylinder 100 so as not to untwist or cut the same as the finger moves upwardly beyond the axial line of the cylinder, as shown in Fig. 6, which also shows the means for compressing the bottom into shape about to engage the twisted paper.

For this purpose, the bar 127 has formed integral with it a rack 141 which meshes with a spur gear 142 to actuate the bottom forming head 143, in synchronism with the twister 132. Gear 142 is mounted on crank arm 142ᵃ from which projects horizontally rod 142ᵇ on which the roller shaped head 143 is mounted to rotate freely.

As the twisting finger 138 is moved upwardly out of the way, the head 143 presses the twisted paper against a concave ejector head 144 (Fig. 14) on an ejector shaft 145 thereby forming the bottom of the container. As shown in Fig. 14 the bottom 148 of container 100 is concaved and formed by the convex surface 149 of the head 143 pressing the twisted and the partially twisted ends of the container into the concave member 144. The convex surface 149 of head 143 extends from the outer edge of the container 100 to approximately the center, but adjacent this point the convex surface 149 is rounded off at 150 so as to relieve the pressure at the center of the container which is applied to the remainder of the bottom. As the infolded end 151 (Fig. 13) of the container always lies near the center and as the pressure in forming the bottom is relieved at this point, there is left a somewhat loose, projecting end.

Figure 7:
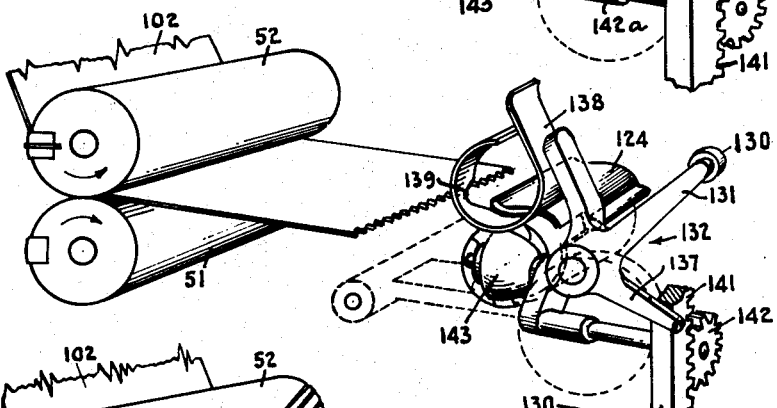
Figure 8:
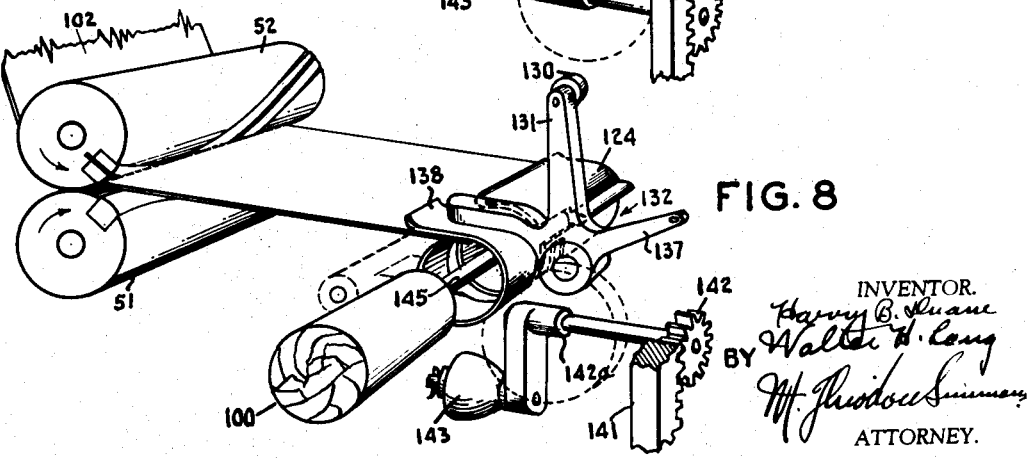

After the bottom is formed, the final position being shown in Fig. 7, the bar 127 returns to its lowermost position, and the related mechanisms to the position shown in Fig. 5, whereupon the ejector bar 145 is actuated to the left (Fig. 1) by cam 145ᵃ, mounted on shaft 48, through pivoted lever 145ᵇ, to eject the finished cylinder or container from the forming mechanism, which is the stage shown in Figs. 1 and 8.

As the finished container is ejected from the mechanism it is picked up by cup receiving tongs 146 (Fig. 1) and deposited upon a conveyor system 147. As the tongs may be of any well-known construction, further detailed description thereof is not believed necessary.

In forming the paper cup or container 100 we found that heretofore when the paper was cut with right angle edges or sides, the outer or exposed edge of the finished cup always stood away from the body of the container along its length, and that by cutting the paper on the bias 103, as shown in Fig. 11, and twisting the bottom in the proper direction, we could obtain a snug fit of the edge 105 (Fig. 12) along the entire length of the container after the bottom of the container was formed. The twisting of the bottom exerts a pull on the exposed edge 105 that aids this desirable result.

Reference was made to leaving a loose projecting end 151 on the bottom of the cup. The purpose of this is so that the cup or cylinder may be readily unwrapped from the ice cream or other substance contained in the cylinder. By pulling out the end 151, the bottom is easily untwisted whereupon the cylinder will unroll from its contents.

Before describing the filling of the cylinder, reference will be made to two other features of the cylinder forming mechanism. To prevent irregular and over-running feed of the roll of paper 98, there is fastened to the side frame of machine 12 (Fig. 1) a frictional member 93 acting on hub 95 of spool 96 and held in contact with said hub 95 by a tension spring 97, one end of which is secured to frictional member 93, the opposite end to the side of machine 12. By this arrangement the roll will be maintained under an even tension, while the parts are of simple construction and easily renewed.

To prevent the paper from tearing in the process of forming the bottom of the container, a trough 152 (Figs. 1 and 1A) is mounted for example on the frame adjacent the spool 96 and carries therein a wick 153, one end of which is held in engagement with one end of the paper on the roll by means of a spring pressed follower 153ᵃ. Thus through capillary action the paper is maintained in the proper state of moistness so that the bottom of the container can be efficiently and properly formed without damage.

The finished cup is deposited on the conveyor 147 which, as shown in Figs. 1, 2 and 3, is operated by arm 154, secured to shaft 48, moving link 155 pivoted at its lower end 156 to one arm of a bell crank 157, the other arm of the bell crank being connected by rod 158 to a spring release pawl and lever 159 for turning ratchet wheel 160, secured to shaft 161. Also secured to shaft 161, which is suitably mounted in bearings fastened to the underside of table 10, is a sprocket 162 and a pulley 163. At the opposite end, or left-hand side looking at Fig. 2, and also mounted in suitable bearings, is a similar sprocket 164 and pulley 165. Over the sprockets 162 and 164 runs a chain 166 having flights 167 equally spaced therealong for moving along and positioning the container 100 to be filled with ice cream. Around the pulleys 163 and 164 is placed a plurality of spaced apart spring wire beltings 168 for conveying the containers 100 placed thereon. The spring action of this belting also holds the conveyor in a taut condition to prevent slippage without the addition of idler pulleys, etc., while such a conveyor is readily cleanable and being of suitable metal is not affected by the atmospheric changes and conditions found in an ice cream plant, for example, As the conveyor moves a container 100 along, a flight 167 engages the container and moves the same between spaced apart guide rails 167ᵃ to proper position under the automatic measuring and filling mechanism 94. Shaft 92 thereof rotates the cam 169 (Fig. 4) secured thereon, the shaft being driven by sprocket 90 (Fig. 3) through clutch 91 having a portion 91ᵃ loosely mounted upon the shaft 92, and a portion 91ᵇ that is slidably keyed to the shaft 92. It will be noted from Fig. 2 that the portion 91ᵇ carries a single tooth 91ᶜ engaging a single mating groove in the portion 91ᵃ when the clutch parts are in engagement with each other. The slidable member 91ᵇ is moved by hand lever 91ᶜ pivoted upon post 93ᵃ. By this arrangement of parts perfect synchronization is maintained between the cylinder forming mechanism, the belt and the depositor. The motor operates the cylinder forming mechanism which in turn moves the belt and the associated positioning flights so that there is a definite coordination between those two mechanisms to deposit a cylinder in front of each of the flights. The notch for receiving the single tooth 91ᵇ of the clutch 91 has a fixed position with respect to the cam 169 of the depositor operating mechanism so that operation of the depositor is always started in definite timed relation to the belt and the cylinder forming mechanism.

A roller which rides in the cam groove of cam 169 is secured to arm 170 for reciprocating link 171. To the lower end of link 171 is secured the measuring container and sleeve valve 114, having inlet port 175 and outlet port 176. As the cam 169 is rotated the inlet port 175 is brought first in register and then out of register with the outlet 177 of the hopper 118, while outlet port 176 is brought first out of register then in register with outlet 179 of the housing 174ᵃ for the sleeve 174. A container 100 is shown on the belt 168 in filling position under the outlet port 179. The actual filling is accomplished by operation of plunger 187 in the following manner:

To the shaft 92 is also secured an eccentric 180, operating in timed relation with cam 169, which oscillates lever arm 181 pivoted at 182 to the link 183. To the free end of arm 181 is pivoted one end of a connecting rod 184, the opposite end being pivotally connected to a slide 185 mounted on slide bar 185ª and having secured thereto a piston rod 186 and piston 187. The piston fits into the measuring container 174 and on its forward movement forces the ice cream out of the container 174 through the registering outlet ports 176 and 179.

It has already been described that the belt 168 is driven in a step-by-step manner, and the flights and drive are arranged so that a container 100 is brought under the outlet port 179 in timed relation with each reciprocation of the plunger 187 and sleeve 174. It will also be understood that the cylinder forming mechanism is so operated in timed relation to the remainder of the mechanism that a formed cup is deposited on the belt conveyor 168 during the period of each filling of a cup so that the operation of the machine is continuous. The filled containers or cups 100 are carried along on the belt conveyor 168 beyond the filling mechanism where they may pass through a freezing chamber, or be packed in cartons, etc., none of the subsequent stages being illustrated because they are largely optional.

It remains to direct attention to the fact that positioning a container 100 for filling is brought about by the relationship between the curve 190 of the flight 167 and the taper of the guide rails 167ª, best illustrated in Fig. 2.

From the foregoing description, taken in connection with the accompanying drawings, it is thought that the complete combination, construction, operation and advantages of our invention will be clear to those skilled in the art to which it relates.

Modifications may be made in the arrangement and location of parts within the spirit and scope of our invention, and such modifications are intended to be covered by the appended claims.

We claim:

1. In a single machine for making and filling individual containers, the combination comprising a conveyor, a mechanism for forming a closed bottom container including means for ejecting the completed container and means for depositing the same on the conveyor, a measuring and filling mechanism including means for ejecting therefrom a measured amount of material and depositing the same in a container supported upon said conveyor, a motor, operating connections therefrom to said container forming mechanism, operating connections therefrom to said conveyor, and operating connections therefrom to said measuring and filling mechanism, said operating connections being so related that a container is deposited on said conveyor as another container is being filled and the operation of said machine is continuous.

2. In a single machine for making and filling individual containers, the combination comprising a conveyor, a mechanism for forming a closed bottom container including means for ejecting the completed container and means for depositing the same on the conveyor, a measuring and filling mechanism including means for ejecting therefrom a measured amount of material and depositing the same in a container supported upon said conveyor, a motor, operating connections therefrom to said container forming mechanism, operating connections from said forming mechanism to said conveyor, and other operating connections from said forming mechanism to said measuring and filling mechanism.

3. In a single machine for making and filling individual containers, the combination comprising a conveyor, a mechanism for forming a closed bottom container including an ejector for the completed container, means for reciprocating the ejector, means for depositing the container on the conveyor, and means for reciprocating the depositing means, a measuring and filling mechanism including a sleeve, means for reciprocating the sleeve, a plunger, and means for reciprocating the plunger, a motor, and operating connections therefrom to each of said reciprocating means to operate the same in timed relation to each other.

4. A cylinder forming machine comprising a roll of material, feeding means therefor, means for severing the material into blanks, a rotating mandrel to which the blanks are fed and on which they are formed into a cylinder, a finger adapted to engage one end of the material cylinder on the rotating mandrel and to be moved past the mandrel as the same is rotated thereby twisting the material engaged by the finger, means for compressing the bottom into desired shape comprising a head having a receding part adjacent the center thereof, means for moving the head into engagement with the twisted material to compress the same, a motor, and operating connections therefrom to cause operation of the various parts of the machine.

5. A cylinder forming machine comprising a roll of material, feeding means therefor, means for severing the material into blanks, a rotating mandrel to which the blanks are fed and on which they are formed into a cylinder, means for preliminarily turning in one end of the material cylinder, means for forming a bottom comprising a head having receding parts adjacent the center and the periphery thereof, means for moving the head into engagement with the turned-in material to compress the same into the shape desired, a motor, and operating connections therefrom to cause operation of the various parts of the machine.

6. A cylinder forming machine comprising a roll of material, feeding means therefor, means for severing the material into blanks, a rotating mandrel to which the blanks are fed and on which they are formed into a cylinder, a finger adapted to engage one end of the material cylinder on the rotating mandrel and to be moved past the mandrel as the same is rotated thereby twisting the material engaged by the finger, means for forming a bottom comprising a horizontally mounted roller having receding portions adjacent the portions thereof engaging at the periphery and adjacent the center of the bottom of the cylinder, means for moving the head into engagement with the twisted material to compress the same into the shape desired, a motor, and operating connections therefrom to cause operation of the various parts of the machine.

7. A cylinder forming machine comprising a roll of material, feeding means therefor, means for severing the material into blanks, a rotating mandrel to which the blanks are fed and on which they are formed into a cylinder, a concave end piece for the mandrel, means for twisting one end of the material cylinder, a horizontally mounted roller, means for moving the roller to compress the twisted material between the roller and the concaved end of the mandrel, means for providing a free end of material on the compressed bottom which may be gripped to undo the cylinder at will, a motor, and operating connections therefrom to cause operation of the various parts of the machine.

8. A cylinder forming machine comprising a roll of material, feeding means therefor, means for severing the material into blanks including a roll having a knife mounted to cut the blank with biased ends, a rotating mandrel adapted to receive a blank and to form a cylinder thereon with side walls of two complete thicknesses of the material and one of the biased edges exposed on the outside of the cylinder, means for twisting one end of the material cylinder after it is formed on the cylinder, a horizontally mounted roller, means for moving the roller to compress the twisted material to form a self-supporting, reinforced bottom, means for providing a free end of material on the compressed bottom which may be gripped to undo the cylinder at will, a motor, and operating connections therefrom to cause operation of the various parts of the machine.

9. A cylinder forming machine comprising a roll of material, feeding means therefor, means for severing the material into blanks, a rotating mandrel, means for feeding a blank to said mandrel, means for guiding a blank around the mandrel including a pivoted portion held in position by gravity and located where it may be readily lifted by hand to expose the mandrel, means for compressing one end of the material cylinder formed on the mandrel, a motor, and operating connections therefrom to cause operation of the various parts of the machine.

10. A cylinder forming machine comprising a standard, a roll of material mounted thereon, a liquid container mounted on the standard, a wick in said container engaging the edge of the roll of material, means for severing the material into blanks, a rotating mandrel, means for feeding a blank onto said mandrel, means for twisting one end of the material cylinder formed on the mandrel, means for compressing the twisted end to form a self-supporting bottom, a motor, and operating connections therefrom for causing operation of the various parts of the machine.

11. A combined cylinder forming and filling machine comprising a mechanism for forming a cylindrical container with a leak-proof self-supporting bottom, means for delivering the container from said mechanism, a conveyor system comprising a belt, a plurality of spaced apart flights moved in unison with said belt, each flight having an outwardly curved portion, the container being deposited on the belt bottom side down and in front of one of the flights so as to be engaged by the curved portion thereof, guide means extending along the belt in position to hold the container between the curved portion of the flight and the guide means, as the container is brought beneath a filling mechanism outlet, means for moving the belt and flights step by step to successively bring containers beneath said outlet, a motor, and connections therefrom to the cylinder forming and filling mechanisms and the belt operating means.

12. A combined cylinder forming and filling machine comprising a mechanism for forming a cylindrical container with a leak-proof self-supporting bottom, means for delivering the container from said mechanism, a conveyor system comprising a pair of pulleys mounted upon a shaft, a plurality of spaced apart endless coiled-spring belts encircling said pulleys, a sprocket on each of said pulley shafts, a chain encircling the sprockets, a plurality of flights mounted on said chain and extending over the spring belts, means for operating one of said pulley shafts step by step, the containers being deposited on said spring belts each respectively engaged by one of said flights, a motor, and connections therefrom to the cylinder forming and filling mechanisms and the conveyor operating means.

13. A cylinder forming machine comprising a roll of material, feeding means therefor, means for maintaining the moisture content of the material comprising a trough, a wick, and means for maintaining a portion of the wick in engagement with the material on the roll, means for severing the material into blanks, a rotating mandrel adapted to receive a blank and to form the same into a cylindrical container.

14. A cylinder forming machine comprising a roll of material, feeding means therefor, means for severing the material into blanks, a rotating mandrel adapted to receive a blank, means engaging one end of the blank on the mandrel to form a closed bottom for the cylinder, a motor, operating connections therefrom to cause operation of the various parts of the machine, and means for moistening the end of the blank engaged by the bottom forming mechanism said means comprising a trough, a wick therein, and a follower engaging a portion of the wick and holding the same in engagement with that portion of the material engaged by the bottom forming mechanism.

HARRY B. DUANE.
WALTER H. LONG.